United States Patent
Shook

(10) Patent No.: US 7,555,838 B2
(45) Date of Patent: Jul. 7, 2009

(54) METHOD FOR PRODUCING A LIGHTWEIGHT BICYCLE WHEEL RIM

(76) Inventor: William B. Shook, 3917 E. Eden Rock Cir., Tampa, FL (US) 36534

( * ) Notice: Subject to any disclaimer, the term of this patent is extended or adjusted under 35 U.S.C. 154(b) by 154 days.

(21) Appl. No.: 11/525,438

(22) Filed: Sep. 22, 2006

(65) Prior Publication Data

US 2007/0067993 A1    Mar. 29, 2007

Related U.S. Application Data

(60) Provisional application No. 60/720,079, filed on Sep. 23, 2005.

(51) Int. Cl.
*B21K 1/38* (2006.01)
(52) U.S. Cl. .............. 29/894.35; 29/894.33; 29/894.353
(58) Field of Classification Search ............ 29/894.354, 29/894.35, 894.33, 894.353, 894; 301/58, 301/99, 95.104, 95.106, 95.107
See application file for complete search history.

(56) References Cited

U.S. PATENT DOCUMENTS

| | | | |
|---|---|---|---|
| 2,034,360 A | 3/1936 | Sill | |
| 4,266,417 A * | 5/1981 | Imamura et al. | 72/168 |
| 5,499,700 A * | 3/1996 | Richardson et al. | 188/77 W |
| 5,651,591 A | 7/1997 | Mercat et al. | |
| 6,070,948 A | 6/2000 | Chen | |
| 6,145,937 A | 11/2000 | Chen | |
| 6,425,641 B1 | 7/2002 | Herting | |
| 6,767,069 B2 | 7/2004 | Chen | |
| 6,961,999 B2 | 11/2005 | Shook | |
| 2004/0163255 A1* | 8/2004 | Shook | 29/894.354 |
| 2005/0242658 A1 | 11/2005 | Carlson et al. | |

FOREIGN PATENT DOCUMENTS

EP    0 579 525 A1    7/1993
EP    0 715 001 B1    3/1999

* cited by examiner

*Primary Examiner*—David P Bryant
*Assistant Examiner*—Sarang Afzali
(74) *Attorney, Agent, or Firm*—David C. Purdue; John C. Purdue

(57) ABSTRACT

A method for producing a bicycle wheel rim is disclosed. The method involves extruding a thin-walled, hollow body having the cross-sectional shape of the rim and an integral external tab. The walls of the hollow body are sufficiently thin that a length of the hollow body without the external tab is subject to buckling when roll formed to produce a rim. The tab is so positioned and sized that the hollow body with the integral external tab is not subject to buckling when roll formed. A portion of the extrusion is then rolled to a circular shape; the circular portion is cut from the extrusion; the free ends are connected, and the external tab is removed.

12 Claims, 3 Drawing Sheets

METHOD FOR PRODUCING A LIGHTWEIGHT BICYCLE WHEEL RIM

BACKGROUND OF THE INVENTION (1) Field of the Invention

The present invention relates generally to rims for wheels for human powered vehicles such as bicycles, wheel chairs and the like, and especially to light weight high performance wheels with light weight rims having deep sections with thin walls and methods for producing them.

(2) Description of Related Art

A great deal of effort has been directed to reducing the weight of human powered wheel rims, especially bicycle rims. Bicycle wheel rims are typically produced by extruding aluminum alloy or the like to produce a linear extrusion having a cross section corresponding with the finished rim, rolling the extrusion into a circular shape, cutting the extrusion to length and connecting the free ends with pins, plugs or welds. In the case of deep V-shaped, aero rims, the rolling of the linear extrusion imposes enormous forces on the extrusion. These forces far exceed the forces that the finished rim must endure in use on a bicycle. Consequently, the thickness of the rim walls tend to be greater than the thickness required for service as a bicycle wheel rim. Typical rim sidewall thicknesses for a bicycle wheel rim tend to be at least 1 mm for V-shaped rims, and thicker for deep sections. The thickness of the sidewalls is required to prevent the sidewalls from buckling during the bending of the linear extrusion in the rolling operation.

U.S. patent application publication No. US 2004/0163255, published Aug. 26, 2004, discloses a method for manufacturing light weight thin walled deep V-section rims by first extruding a rim section with sidewalls much thicker and heavier than the desired rim sidewalls. The extrusion can be rolled to form the rim without buckling of the sidewalls and then the excess material can be removed from the sidewalls, for example by sanding, using flap wheels. This method works but has some disadvantages, such as non-precise control of the sidewall thickness and expense of the process.

European Patent No. 0715001 discloses a technique for producing a bicycle wheel rim involving the production of a linear extrusion, rolling the extrusion, cutting the extrusion to length and joining the free ends to produce a rim blank. The thickness of the walls of the rim blank exceed the desired wall thickness for a finished rim and the rim blank is immersed in a caustic chemical to remove metal from the rim until a desired wall thickness is achieved. The rim blank is then rinsed, immersed in a neutralizing bath, rinsed again and dried. This method reduces the thickness of the rim blank walls generally uniformly for small amounts of reduction.

U.S. Pat. No. 5,651,591 discloses a bicycle wheel rim having a lower bridge or rim floor having a thickness of about 0.7 mm. According to the patent, the rim blank is extruded with side walls (wings) and a lower flange (lower bridge) that are thicker than the final dimensions. After the extrusion is rolled, cut and joined, the rim blank is machined by chemical machining, to reduce uniformly the thickness of the wings and bridges, or mechanically machined to reduce the thickness of the lower bridge. The mechanical machining is carried out by milling, turning or grinding.

European patent No. 0579525 discloses a rim production technique according to which an extrusion is rolled and cut to length and the ends are joined to produce a rim blank. The rim blank is then machined to form two opposed braking surfaces by machining material from the two opposed flanks. The machining is carried out by turning or by using a cutter.

Deep V-section rims or aero rims pose unique fabrication challenges. When the linear extrusion is bent in the rolling operation, the relatively deep and thin sidewalls must not buckle. Consequently, deep V-section rims have side walls that are thick enough to survive the rolling operation without buckling, which means that they are substantially thicker than they need to be to stand up to the stresses that they see in service. Thus, there is a weight penalty associated with deep V-section aero rims produced in this way and, because the weight is at or near the outer portion of the wheel, it degrades the rotational inertia properties of the wheel.

BRIEF SUMMARY OF THE INVENTION

The present invention is a deep V-section aero rim for a tensioned spoke wheel and a method for producing it. The rim is produced by extruding a suitable alloy into a rim profile of the desired cross sectional shape, including deep, thin side walls and a "rolling tab" of material joined to the rim profile preferably by a thin neck at what will be the innermost portion of the rim profile. The extrusion is then rolled, either on conventional rolling apparatus or with apparatus designed to pull directly on the rolling tab. The sidewalls can withstand the bending required without buckling because of the effect of the additional tab of material, or rolling tab, joined to the rim profile. This additional tab of material is subsequently broken off or removed by pinch rolls acting on the thin neck provided to make removal easy, or by other common cutting methods. The additional tab of material, or rolling tab, can be removed either before or after the rolled extrusion is cut and the ends are joined to form a rim in the conventional manner.

Accordingly, it is an object of the present invention to provide an improved rim for bicycle wheels.

It is a further object of the invention to provide a simple and cost effective method for producing an improved rim.

It is a further object of the present invention to provide a rim with a side wall thickness less than that required to roll the rim from an extrusion having the cross-sectional shape of the rim.

It is a further object of the present invention to provide a rim with a desired sidewall thickness as extruded and rolled, and not requiring a reduction in sidewall thickness after rolling.

It is a further object of the present invention to provide a method for rolling a deep section rim without applying a deleterious force on the top of the rim profile at the hook beads.

These and other objects and advantages of the present invention will be fully appreciated by those skilled in the art from the disclosures herein.

DETAILED DESCRIPTION OF THE PREFERED EMBODIMENTS

Figure 1:
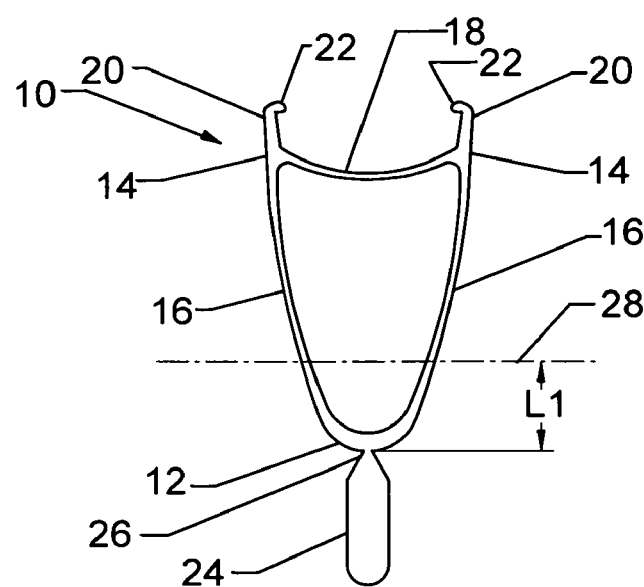
FIG. 1 is a cross-sectional view of a linear extrusion, including a roll tab, for producing an aero rim according to the present invention.

Referring to FIG. 1, a linear extrusion indicated at 10 comprises a rim floor or spoke bed 12, two opposed brake surfaces 14 and two opposed side walls 16 extending between the spoke bed 12 and the brake surfaces 14. A transverse flange 18 extends between the upper portions of the extrusion 10, adjacent to the braking surfaces 14. Tire flanges 20 extend upwardly from the transverse flange 18 and terminate in tire bead hooks 22. A rolling tab 24 is joined to the spoke bed 12 by a thin neck 26. A line 28 at a distance L1 from the bottom of the spoke bed 12 represents the neutral bending center for the extrusion 10; i.e., when a length of the extrusion 10 made from a typical rim alloy is rolled to the shape of a rim, the portions of the sidewalls 16 between the line 28 and the flange 18 are stressed in tension, and the portions of those sidewalls more remote from the flange 18 are compressed and are subject to buckling. The side walls 16, as extruded, have the thickness desired in the finished rim. The neutral bending center at the line 28 is close enough to the spoke bed 12 that the side walls 16 are of adequate thickness to prevent buckling from the compressive stress undergone during rolling in conventional rolling apparatus. The position of the neutral bending center indicated at line 28 is determined by the geometry of the extrusion 10, the material from which it is extruded and the thicknesses of the portions of the extrusion 10. The rolling tab 24 is part of the geometry of the extrusion 10.

Figure 2:
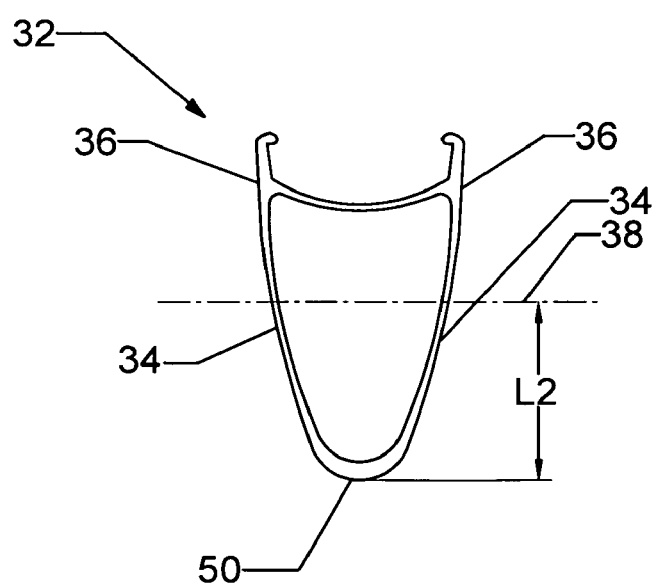
FIG. 2 is a cross-sectional view of a finished aero rim according to the present invention.

After the extrusion 10 of FIG. 1 has been rolled, the rolling tab 24 is separated at the neck 26 from the spoke bed 12, to produce a spoke bed 30 (FIG. 2) in the finished rim 32, which has sidewalls 34 extending between braking surfaces 36 and the spoke bed 30. The neutral bending center of the rim 32 is indicated by a line 38, which is a distance L2 from the bottom of the spoke bed 30. The distance L2 in FIG. 2 is greater than the distance L1 in FIG. 1. The length of side walls 34 extending below the line 38 is greater than the length of side walls 16 extending below the line 28 of FIG. 1. The rim 32 could not be produced by rolling an extrusion having the cross sectional shape of the rim, because the portion of the sidewalls 34 between the line 38 and the spoke bed 30 would buckle. The neutral bending center of an extrusion that is to be rolled to a new contour is the line of zero bending stress. When the extrusion is rolled, the portion of the extrusion that is above or outside of this line is subjected to tensile stress and the portion of the extrusion that is below or inside of this line is subjected to compressive stress. Buckling failure only occurs in compression and not in tension. Buckling failure occurs in thin sections at relatively higher compressive loads and away from any supporting members.

The roll tab 24 (FIG. 1) is of sufficient size and shape to lower the neutral bending center of the extrusion 10 from where it would be, without the tab 24, as shown in FIG. 2 by the line 38 at the distance L2 from the spoke bed 30, to the lower position shown in FIG. 1 by the line 28 at the distance L1 from the bottom of the spoke bed 12. According to the invention, the distance L1 must be sufficiently short that the sidewalls 16 do not buckle during rolling. This distance from the spoke bed 12 to the neutral bending center can be adjusted by varying the size and shape of the roll tab 24, which is joined to the spoke bed 12 by the neck 26 which is thin enough to make removal after rolling of the extrusion easy. It is possible to use pinch rollers to remove the tab 24 at the neck 26, which must be thick enough that it does not break off during bending or rolling of the rim, yet thin enough to make removal easy.

There are other ways to attach a roll tab to an extrusion, and also other ways to remove the tab. The roll tab can be attached by a thick neck and then machined off or attached at a notch and then broken off. There are many other ways to remove the material below the spoke bed, as will be apparent to persons skilled in the art. Often, the choice of methods depends upon the availability of machinery, and various economic considerations.

Figure 3:
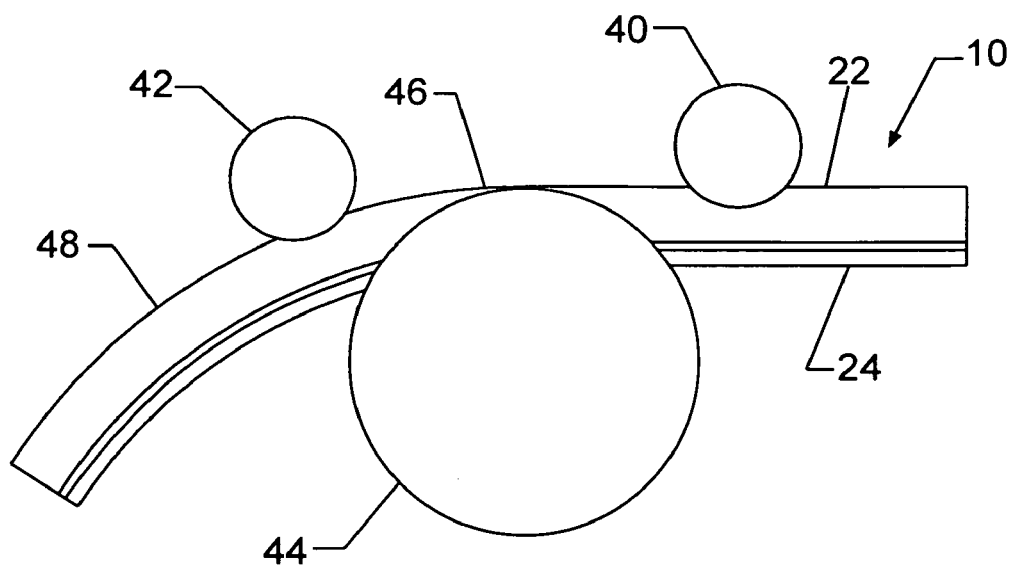
FIG. 3 is a side view of conventional rim rolling apparatus for rolling extrusions into rims pre-forms.

Referring now to FIG. 3, conventional rim rolling apparatus suitable for rolling the extrusion 10 comprises a roller 40, a roller 42 and a form roller 44. A length of the linear rim extrusion 10 is rolled to a circular shape in the apparatus of FIG. 3 as the roller 44, which is power driven, drivingly engages a lower portion of the extrusion 10 while rollers 42 and 44 bear down on the extrusion 10 and, specifically, on the hook beads 22, causing the extrusion to bend around the form roller 44, as shown at 46, to produce the desired curvature as shown at 48. After the extrusion 10 is formed into a circular shape, it is then cut to the required length and the roll tab is removed although the roll tab can be removed before the extrusion 10 is cut. It has been discovered that, when the roll tab is removed, the curvature of the rolled extrusion will change so that the rolled extrusion has a larger diameter after the roll tab is removed than it does while the roll tab is attached. Preferably, this is taken into account when the extrusion is rolled so that the curvature of the extrusion, after the roll tab is removed, is the desired curvature. The cut ends of the rolled extrusion are then connected by any suitable means, e. g., a plug connection, pinning, welding, and the like, to produce a rim blank. It will be appreciated that the extrusion 10, for producing a deep section aero rim, requires more bending force to roll it than, for example, an extrusion made for producing a shallow box section rim. The extrusion 10, with the roll tab 24 requires more bending force to roll it than a conventional extrusion, without the roll tab 24, for producing a deep section aero rim. The extra forces required to roll an extrusion 10 according to the invention, including the roll tab 24, may compromise the integrity of the extrusion 10 when it is rolled on conventional equipment.

Figure 4:
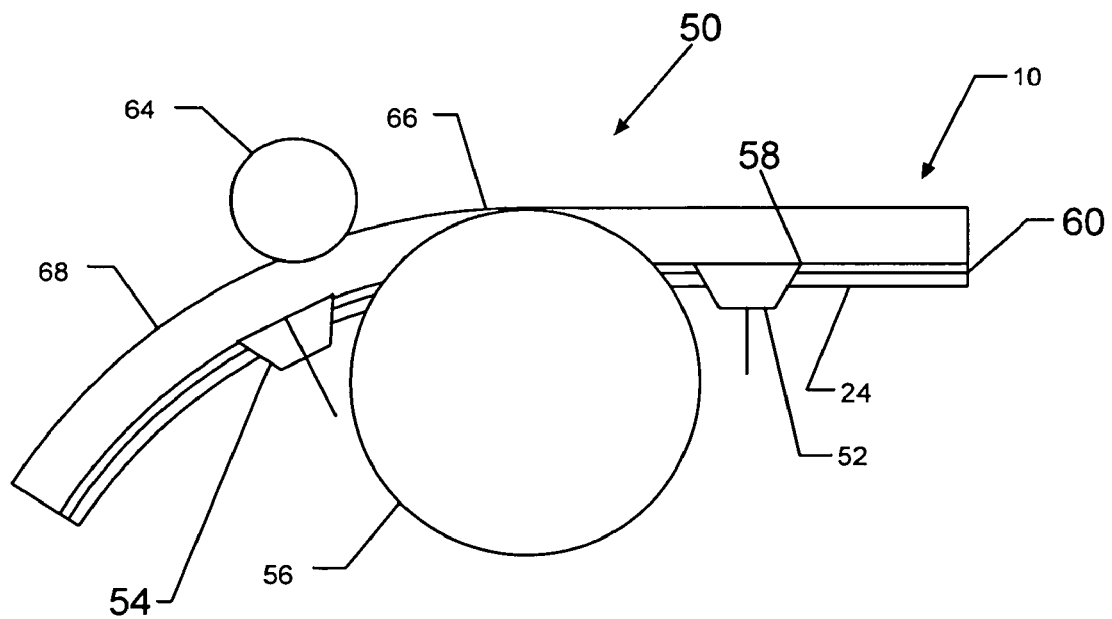
FIG. 4 is a side view of rim rolling apparatus which has been modified in accordance with a second embodiment of the present invention to produce aero rims according to the invention.
Figure 5:
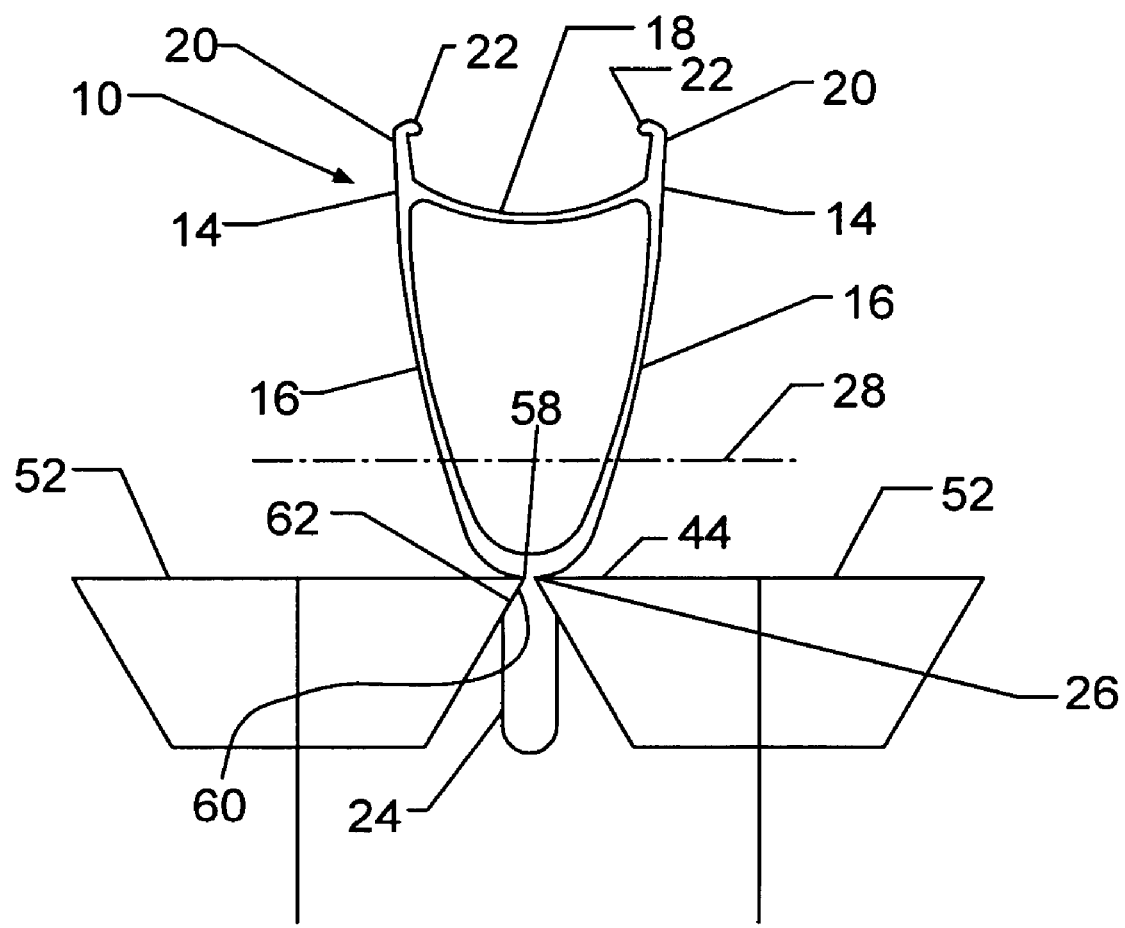
FIG. 5 is an end view of rollers which are a part of the apparatus of FIG. 4, and are used to engage and pull on the roll tab of a linear extrusion during the rolling of an extrusion to produce aero rim pre-forms in the apparatus of FIG. 4.

Referring to FIGS. 4 and 5, the use of modified rim rolling apparatus indicated generally at 50 to roll an extrusion 10 will now be described. The apparatus 50 comprises a pair of rollers 52, a pair of rollers 54 and a form roller 56 in between the pairs of rollers 52 and 54. The rollers 52 and 54, as shown in FIG. 5, are right rectangular parallelepipedal in cross section. Upper edges 58 of the rollers 52 extend into the neck 26 of the roll tab 24, and inclined sides 60 of the rollers 52 engage similarly inclined surfaces 62 formed on the roll tab 24. Rollers 54 are shaped the same as the rollers 52. A roller 64 is operable to deflect the leading end of the extrusion 10 towards the rollers 54 for engagement between the rollers 54 and the inclined surfaces 62 of the roll tab 24, as the shaping roller 56 drives the extrusion 10 through the apparatus 50. When the rollers 54 fully engage the inclined surfaces 62 of the roll tab 24, the extrusion 10 will be pulled away from the roller 64. As the forming roller 56 drives the extrusion 10, the engagement between the rollers 52 and 54 with the roll tab 24 will cause the extrusion 10 to bend as it passes over the forming roller 56, as indicated at 66, thereby forming it into the required circular shape having the desired curvature 68, which may, as indicated above, be a smaller radius of curvature than is desired in the final rim blank because the radius of curvature will likely increase when the rolling tab 24 is removed. Rim rolling apparatus 50 is particularly advantageous because the force required to bend the extrusion 10 is applied to the lower portion of the extrusion 10 and, in particular, to the rolling tab 24 (FIG. 5). The apparatus 50 enables rolling of the extrusion 10 without risk of deformation and, in particular, without deformation of the hook beads 22.

After the extrusion 10 is formed into a circular shape on the apparatus 50, the rolling tab 24 is removed and the remainder of the extrusion 10 is cut to the required length. If desired, the extrusion can be cut before the rolling tab 24 is removed. The cut ends of the rolled extrusion are then connected by any suitable means, e. g., a plug connection, pinning, welding, and the like, to produce a rim blank.

For purposes of comparison, but not in accordance with the instant invention, a comparative extrusion was produced that was similar to the extrusion 10 except that it did not have the rolling tab 24 and the associated neck 26. The comparative extrusion was fed through conventional rim rolling apparatus in an attempt to roll rims from the extrusion. Instead of forming rims, the rim rolling apparatus caused buckling of the side walls of the extrusion, near where the side walls join with the spoke bed.

It will be appreciated that various changes and modifications can be made from the apparatus specifically disclosed above without departing from the spirit and scope of the instant invention as defined in the appended claims and that, in its essential details, the instant invention is a method for producing a rim for a bicycle wheel which comprises the steps of extruding a thin-walled, hollow body having the cross-sectional shape of the rim to be produced and an external tab integral with the extruded body, rolling a portion of the extrusion to a circular shape, cutting the circular portion from the extrusion, connecting the free ends of the circular portion, and removing the external tab from the circular portion of the extrusion. Preferably, the extrusion is rolled on conventional rolling apparatus unless that would impose too much stress on the extrusion in which case the extrusion can be rolled on apparatus including at least two rollers that each engage at least one surface on the tab and force a bend in the extrusion as it passes over a forming roller between the rollers.

The walls of the hollow body are sufficiently deep and thin that a length of the hollow body without the external tab is subject to buckling when roll formed to produce a rim, and the tab is so positioned and sized that the hollow body with the integral external tab is not subject to buckling when roll formed.

Preferably, the tab is connected to the extrusion by a thin neck, is removed before the free ends of the extrusion are connected, and is shaped to engage rollers used to roll form the rim.

I claim:

1. A method for producing a rim for a bicycle wheel, said method comprising the steps of:
    extruding a hollow body having a cross-sectional shape comprising a rim floor, two side walls and a transverse flange opposite the rim floor, said hollow body having a shape corresponding with that of the rim to be produced and an external tab depending from the rim floor and extending away from the hollow body, the neutral center of the hollow body with the external tab attached thereto being closer to the rim floor than it would be without the external tab,
    rolling a portion of the extrusion to a circular shape,
    cutting the circular portion from the extrusion, and
    connecting the free ends of the circular portion.

2. The method claimed in claim 1 wherein the external tab is removed from the circular portion of the extrusion before the free ends of the circular portion are connected.

3. The method claimed in claim 1 wherein the external tab is joined to the extrusion by a thin neck to make removal of the tab easier.

4. The method claimed in claim 1 wherein a portion of the external tab is shaped to be engaged by rollers used to roll form the rim.

5. The method claimed in claim 1 wherein the external tab is removed before the step of cutting the circular portion from the extrusion.

6. The method claimed in claim 1 wherein the external tab is removed after the step of cutting the circular portion from the extrusion is carried out.

7. In a method for producing a rim for a bicycle wheel, said method comprising the steps of
    extruding a hollow body having a cross-sectional shape corresponding with that of the rim to be produced, said shape comprising a rim floor, two side walls and a transverse flange opposite the rim floor,
    rolling a portion of the extrusion to a circular shape,
    cutting the circular portion from the extrusion, and
    connecting the free ends of the circular portion,
the improvement wherein the hollow body is extruded with an external tab depending from the rim floor and extending away from the hollow body, wherein the neutral bending center of the hollow body with the external tab attached is closer to the rim floor than the neutral bending center of the hollow bed would be without the external tab attached thereto and wherein the external tab is removed from the rim floor after the rolling step.

8. The improvement claimed in claim 7 wherein the external tab is removed from the circular portion of the extrusion before the free ends of the circular portion are connected.

9. The improvement claimed in claim 7 wherein the external tab is joined to the extrusion by a thin neck to make removal of the tab easier.

10. The improvement claimed in claim 7 wherein a portion of the external tab is shaped to be engaged by rollers used to roll form the rim.

11. The improvement claimed in claim 7 wherein the external tab is removed before the step of cutting the circular portion from the extrusion.

12. The improvement claimed in claim 7 wherein the external tab is removed after the step of cutting the circular portion from the extrusion is carried out.

* * * * *